United States Patent
Zehnle

(10) Patent No.: US 9,431,877 B2
(45) Date of Patent: Aug. 30, 2016

(54) CONCENTRIC RING GENERATORS

(71) Applicant: The Boeing Company, Huntington Beach, CA (US)

(72) Inventor: Joseph J. Zehnle, Berkeley, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/558,935

(22) Filed: Dec. 3, 2014

(65) Prior Publication Data

US 2016/0164372 A1 Jun. 9, 2016

(51) Int. Cl.
*F01D 15/10* (2006.01)
*H02K 7/18* (2006.01)
*H02K 15/03* (2006.01)

(52) U.S. Cl.
CPC ............ *H02K 7/1823* (2013.01); *H02K 15/03* (2013.01)

(58) Field of Classification Search
CPC ........................................................ F01D 15/10
USPC ............................................................ 290/52
See application file for complete search history.

(56) References Cited

U.S. PATENT DOCUMENTS

| | | | | |
|---|---|---|---|---|
| 2,610,993 A * | 9/1952 | Stark | ...................... | H02K 23/46 310/154.34 |
| 3,143,972 A * | 8/1964 | Smith | ...................... | B63H 11/08 310/62 |
| 3,264,482 A * | 8/1966 | Clark | ...................... | F01D 15/10 290/38 A |
| 4,123,666 A * | 10/1978 | Miller | ...................... | F01D 15/10 290/52 |
| 4,367,413 A * | 1/1983 | Nair | ...................... | F03B 13/083 290/43 |
| 4,577,116 A * | 3/1986 | Pinson | ...................... | H02K 7/1823 290/43 |
| 4,862,009 A * | 8/1989 | King | ...................... | F02N 11/04 290/22 |
| 5,834,874 A * | 11/1998 | Krueger | ...................... | H02K 21/025 310/156.26 |
| 5,844,341 A | 12/1998 | Spooner et al. | | |
| 5,874,797 A * | 2/1999 | Pinkerton | ...................... | H02K 7/025 310/112 |
| 6,781,276 B1 * | 8/2004 | Stiesdal | ...................... | F03D 1/001 290/44 |
| 6,840,479 B1 | 1/2005 | Przygoda et al. | | |
| 7,721,555 B2 * | 5/2010 | Sharp | ...................... | F01D 15/10 60/226.1 |
| 8,294,290 B2 * | 10/2012 | da Silva | ...................... | F03B 13/105 290/52 |
| 8,745,990 B2 * | 6/2014 | Burkholder | ...................... | F01D 9/065 290/47 |
| 8,791,616 B2 * | 7/2014 | Canini | ...................... | H02K 1/14 310/156.32 |
| 2007/0157597 A1 * | 7/2007 | Sharp | ...................... | F01D 15/10 60/226.1 |
| 2014/0133985 A1 * | 5/2014 | Mongeau | ...................... | F03D 9/002 416/95 |

* cited by examiner

*Primary Examiner* — Joseph Waks
(74) *Attorney, Agent, or Firm* — Parsons Behle & Latimer

(57) ABSTRACT

A concentric generator usable with a gas turbine engine having a shaft. Disclosed embodiments include a generator with a rotor integral with the gas turbine shaft and a stator mounted concentrically with respect to the rotor. The stator may be mounted inside the turbine engine housing, or outside the turbine housing. In some embodiments, both the rotor and stator are mounted outside the turbine housing and rotation of the turbine shaft is translated to the rotor via a transmission.

18 Claims, 4 Drawing Sheets

CONCENTRIC RING GENERATORS

FIELD OF THE DISCLOSURE

This disclosure relates to electric generators, and more particularly to concentric ring generators for advantageous use in aircraft having gas turbine engines.

BACKGROUND

In general, military and commercial aircraft are increasingly relying on electrical systems to perform functions that were previously performed by mechanical or hydraulic systems. In general, some manufacturers are working to manufacture an "all electric" aircraft that has reduced weight and, thus, has increased fuel efficiency and/or range.

Moreover, modern communication, navigation, avionics, weapons systems, etc., are consuming ever increasing amounts of electric power. As a result, power demands on the existing aircraft power plant are increasing and expected to continue increasing in the future. For example, some known aircraft generators currently in service are capable of generating approximately 100 kW of electric energy. While this quantity of energy is sufficient to meet today's typical aircraft energy requirements, it may not be sufficient to meet future energy requirements as discussed above.

One solution to meeting additional power needs is to install a larger, higher output generator to meet the increased energy demands. However, installing a larger generator is often not feasible on modern aircraft. For example, the aircraft may not have enough "open space" to accommodate the physical size of a larger generator. For example, at least some known aircraft generators are driven by a single power take-off ("PTO") shaft that also drives many other hydraulic and pneumatic pumps. As discussed above, as electrical power requirements increase, the torques and stresses on the PTO shaft due to a larger generator would also increase significantly. Additionally, it is often not practical to modify the aircraft to support a larger generator for cost and other reasons. Other drawbacks and disadvantages with current aircraft generators may also exist.

SUMMARY

Accordingly, the disclosed systems and methods substantially address the above-noted drawbacks and disadvantages of existing systems. In general, the disclosed generator incorporates a concentric ring design that may be incorporated internally within a turbine engine, such as an aircraft engine, or externally around the outer surface of the engine, or in combinations of internal and external mounting. In so configuring the generator, it affords a relatively larger surface area for the stator coils of the generator and, in some embodiments, allows for the radial positioning of independent stator coils with respect to the rotor, which may be used to regulate output power and voltage as disclosed herein.

In addition, the disclosed systems and methods allow for an efficient step down (buck) of the relatively high voltage created by embodiments of the disclosed generator, as compared to the step up (boost) required by conventional aircraft generators. Likewise, embodiments of the disclosed generator enable variable frequency output that may be advantageous in some applications.

Embodiments of the disclosed generator also enable manufacturing of a generator with relatively less copper (in coils or windings) while allowing for higher voltages (with increased insulation). Furthermore, the concentric configuration enables a relatively simpler mechanical connection with the engine and may eliminate the need for PTO shafts or other transmissions. For embodiments that rely on planetary gearing, the loads and torques on the generator and engine can be distributed over numerous gears. Other advantages also exist.

Accordingly, disclosed embodiments include a generator comprising a turbine engine comprising a shaft, a compressor, and a turbine, a rotor in mechanical communication with the shaft and configured to be rotated by motion of the shaft, a stator comprising at least one coil wherein the stator is disposed radially outward of the rotor and wherein rotation of the rotor within the stator causes the generation of electric power. In some embodiments, the rotor and the stator are concentric with the shaft of the turbine engine. In some embodiments, the rotor further comprises a permanent magnet rotor.

In some embodiments the generator includes a housing substantially enclosing the turbine engine and the stator is mounted substantially inside the housing. In some embodiments, the stator is mounted substantially outside the housing.

In some embodiments, the generator includes a transmission to transfer motion of the shaft to the rotor, and the rotor and stator are concentrically mounted substantially outside the housing. In some embodiments, the transmission further comprises at least one gear in mechanical communication with the rotor and imparting rotational motion to the rotor in response to motion of the shaft. In some embodiments, the at least one gear is a planetary gear.

In some embodiments, the generator further includes positioning means for moving the at least one coil. In some embodiments, the positioning means enables the at least one coil to move radially with respect to the rotor.

Also disclosed is a method of manufacturing a generator comprising connecting a rotor in mechanical communication with a shaft of a turbine engine so that the rotor is rotated by motion of the shaft, positioning a stator comprising at least one coil radially outward of the rotor, concentric with the rotor and the shaft of the turbine engine, and wherein rotation of the rotor within the stator causes the generation of electric power.

In some embodiments, the method further comprises mounting the stator substantially inside a housing of the turbine engine. In some embodiments, the method further comprises mounting the stator substantially outside a housing of the turbine engine.

In some embodiments, the method of manufacturing further comprises concentrically mounting the rotor and stator substantially outside a housing of the turbine engine, connecting a transmission to transfer motion of the shaft to the rotor, and providing positioning means for moving the at least one coil.

Also disclosed is a concentric generator comprising a turbine engine comprising a shaft, a compressor, and a turbine, a rotor, mounted concentrically with the shaft, and in mechanical communication with the shaft wherein the rotation of the shaft causes rotation of the rotor, a stator comprising at least one movable coil positioned concentrically and radially outward of the rotor and wherein rotation of the rotor within the stator causes the generation of electric power.

In some embodiments, the turbine engine further comprises a housing and the stator is mounted substantially outside the housing. In some embodiments, the stator is mounted substantially inside the housing.

In some embodiments the generator is manufactured such that the rotor is formed integrally with at least one of the compressor and turbine. In some embodiments, the rotor and compressor are both in mechanical communication with the shaft. In some embodiments, the rotor and turbine are both in mechanical communication with the shaft. Other advantages and characteristics of the disclosed embodiments will be apparent from the following detailed description.

Figure 1:
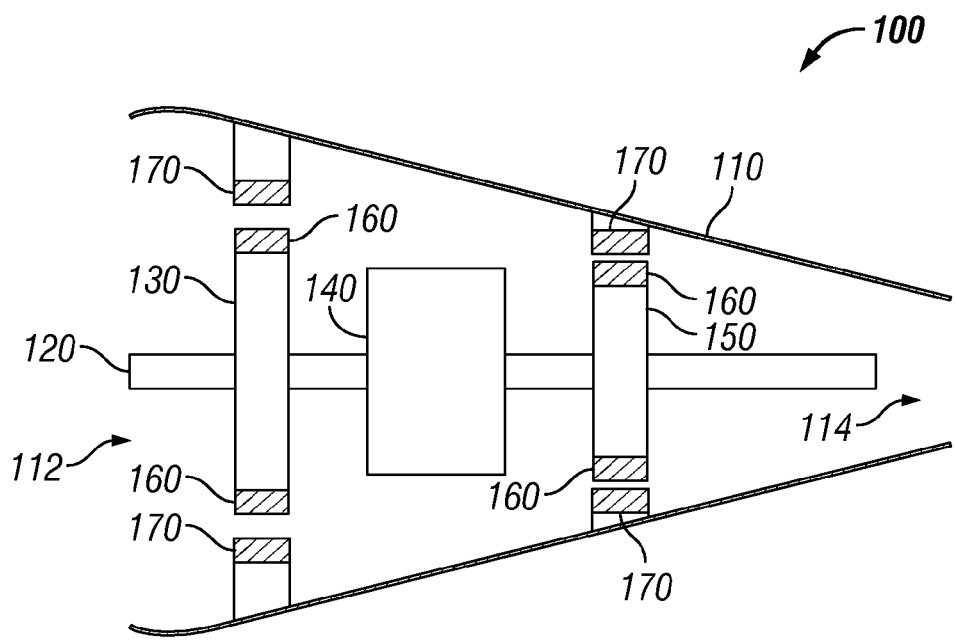
FIG. 1 is a schematic side view of an internal concentric ring generator in accordance with some disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

In general, a concentric ring generator 100 is disclosed. In some embodiments, the generator 100 is used in conjunction with a turbine engine 110, such as a gas turbine engine commonly used on jet aircraft. The generator 100 may be driven by the turbine 110 on-board an aircraft. The generator 100 includes a rotor 160 and a stator 170 generally arranged in a concentric fashion. In some embodiments, the rotor 160 is ring shaped with an inner diameter that is sized to be located radially outward from the turbine engine 110. In some embodiments, the generator 100 is configured to be placed around the turbine engine 110. In other embodiments, the generator 100 may be integral with the turbine engine 110. For embodiments where the generator 100 encircles the turbine engine 110, appropriate gearing may be used (e.g., planetary gears 180 shown in FIG. 4) to enable the turbine engine 110 to drive the rotor 160.

In some embodiments, generator 100 may include a stator 170 that is capable of moving with respect to the rotor 160 and thereby, among other things, being able to control the amount of generated output current. For example, in some embodiments, at least portions of stator 170 may be movable radially outward with respect to the rotor 160 to control the amount of current generated by generator 100. Other embodiments may also move the coils out of the field in directions other than radially.

FIG. 1 is a schematic side view of an internal concentric ring generator in accordance with some disclosed embodiments. As shown generator 100 may be integrated into a turbine engine 110. As schematically indicated turbine engine 110 will have an intake portion 112 and an exhaust portion 114. An engine shaft 120 will rotate a compressor 130 to draw in air from intake portion 112 and direct it into a combustion chamber 140 and out through turbine 150 and exhaust portion 114.

As shown in FIG. 1, embodiments of generator 100 may comprise a rotor 160 that is integrally formed in any of the compressor 130, turbine 150, or both. For example, rotor 160 may comprise an outer portion of compressor 130, or rotor 160 may comprise a separate structure, such as a magnetized ring, or segments of permanent magnets that is mounted on an outer portion of compressor 130 and enabled to rotate therewith. Similar configurations may also be located at the turbine 150, or both compressor 130 and turbine 150 may include a rotor 160.

Figure 2:
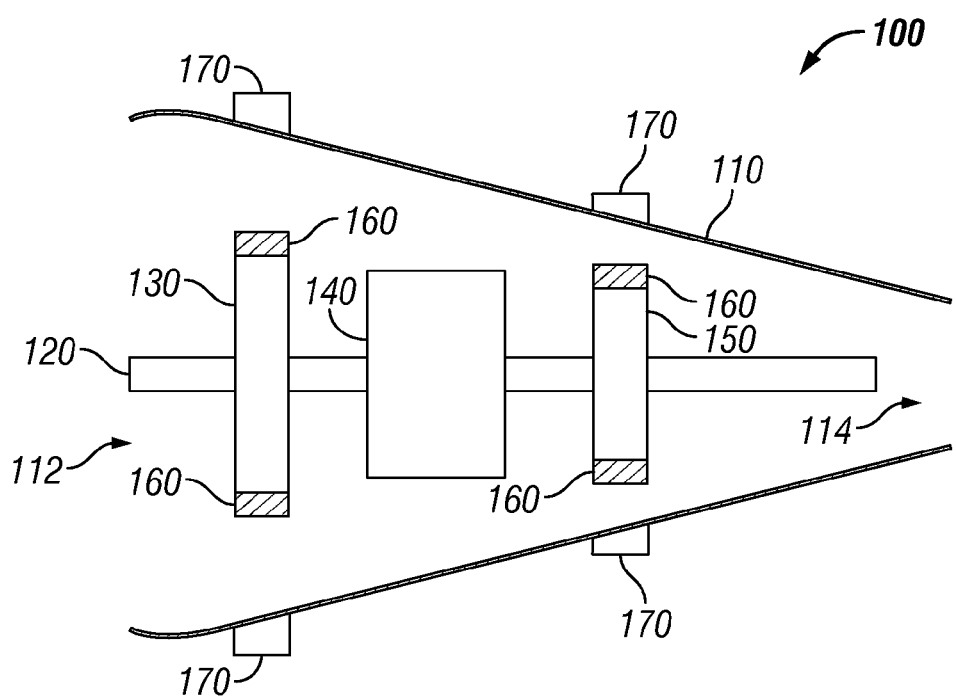
FIG. 2 is a schematic side view of a concentric ring generator with an external stator in accordance with some disclosed embodiments.

As shown in FIG. 1, embodiments of generator 100 may also comprise a stator 170. For the embodiment shown in FIG. 1 the stator 170 is mounted internally in engine 110 and encircles rotor 160. For the embodiment shown in FIG. 2, stator 170 is mounted externally to engine 110 and encircles rotor 160 internal to engine 110. In addition, other combinations of internal and external mounting may be used.

Rotor 160 and stator 170 may comprise any suitable components of an electrical machine and will further comprise coils, windings, magnets, ferrous materials, or the like to enable the generation of electrical current. As is also typical, rotor 160 will rotate under the influence of the forces generated by the engine 110 and stator 170 will remain generally stationary. Furthermore, either rotor 160 or stator 170 may comprise one or the other of the field producing component and the current producing component (i.e., armature).

Figure 3:
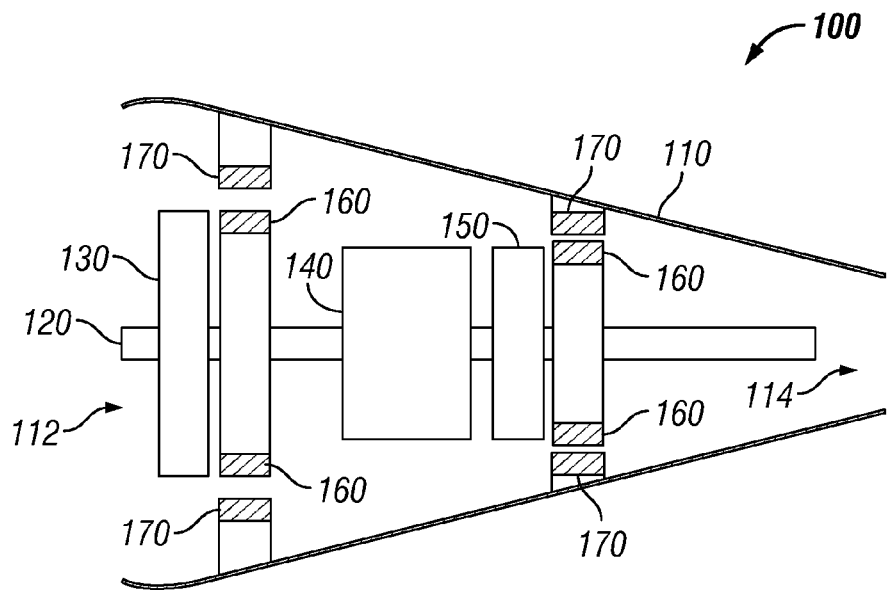
FIG. 3 is a schematic side view of an internal concentric ring generator in accordance with some disclosed embodiments.

FIG. 3 is a schematic side view of an internal concentric ring generator in accordance with some disclosed embodiments. In the embodiments shown in FIG. 3, rotor 160 may comprise a discrete component separate from either compressor 130 or turbine 150. Rotor 160 may be connected to shaft 120 and will still rotate under the influence of engine 110. In addition, while rotor 160 is shown as being mounted "downstream" of compressor 130 and "upstream" of turbine 150, the generator 100 is not so limited and other mounting locations of rotor 160 may be used.

Figure 4:
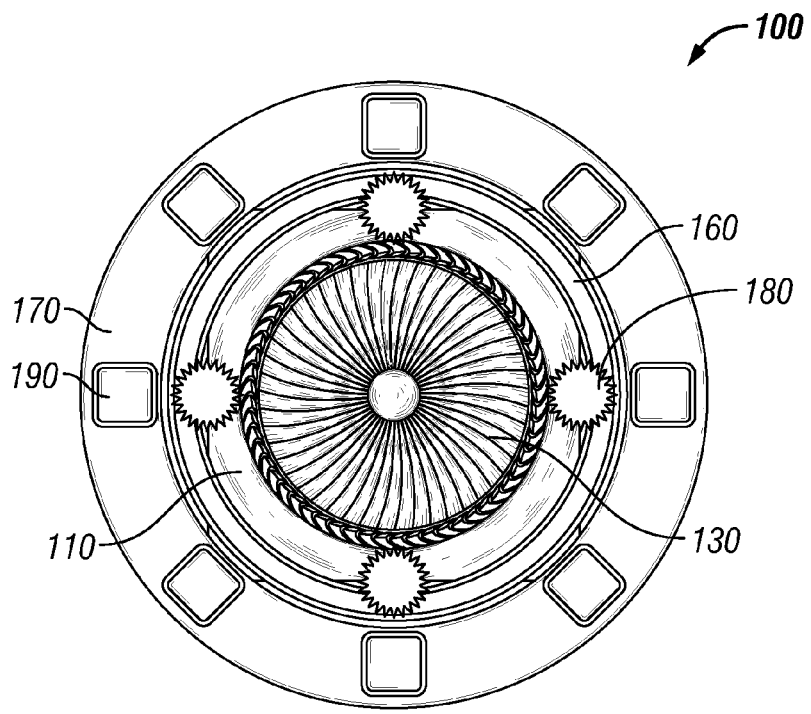
FIG. 4 is a schematic front view of an external concentric ring generator in accordance with some disclosed embodiments.

FIG. 4 is a schematic front view of an external concentric ring generator 100 in accordance with some disclosed embodiments. For this embodiment, both the rotor 160 and stator 170 are externally mounted, concentrically, on the engine 110 and one or more gears 180 may be used to impart the motion of the engine shaft 120 to the rotor 160. As indicated, gears 180 may be part of planetary gearing system selected to rotate rotor 160 at any desired rotations per minute ("RPM"). Of course, other gearing, or transmission systems, may also be implemented.

As also illustrated in FIG. 4, embodiments of the generator 100 may also include discrete stator coils 190 that may further comprise moveable portions that enable the movement of the coils 190 to change the field strength, the current, or the voltage produced by the generator 100.

Figure 5:
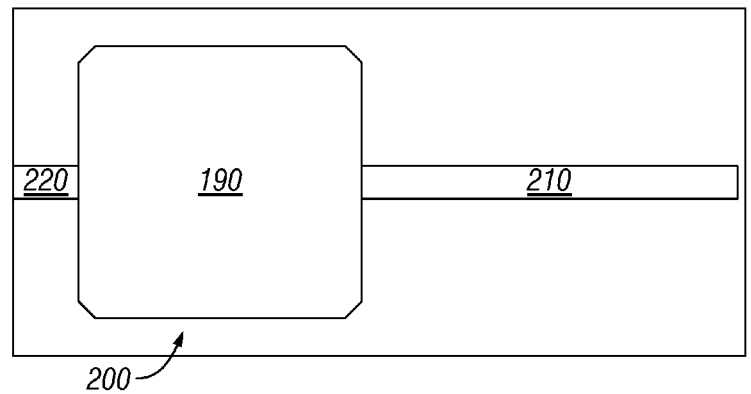
FIG. 5 is a schematic illustration of a movable stator coil in accordance with some disclosed embodiments.

FIG. 5 is a schematic illustration of a movable stator coil 190 in accordance with some disclosed embodiments. As illustrated schematically in FIG. 5, stator coils 190 may be mounted on a positioning means 200 so that coil 190 may be moved "closer" or "farther" from the rotor 160. Positioning means 200 may comprise a mechanical positioner such as a screw jack, a rack and pinion gear system, levers, hinged arms, or the like that enable the motion of the coil 190 back-and-forth radially with respect to rotor 160, and, generally will comprise an actuator 210 and a reciprocal biasing member 220. For example, actuator 210 may comprise the screw portion of a screw jack and the reciprocal biasing member may comprise the reversible motor that drives the screw in the forward or reverse direction that moves the coil 190 back-and-forth.

Positioning means 200 may also comprise a pneumatic, hydraulic, or other pressure-based position changer. As indicated schematically in FIG. 5, for embodiments when positioning means 200 comprises a pressure-based system it may include an actuator 210 at a first pressure and reciprocal biasing side 220 that is at a different pressure and can be used to bias the stator coil 190 in the opposite direction as the actuator 210.

In addition, embodiments of positioning means 200 may also comprise piezo-electric or other electrical transducer that can be used to position the coils 190 by changing the current or voltage to the transducer.

In general, positioning means 200 may be used as a safety mechanism by enabling a stator coil 190 to be "dumped" or removed from the system if it shorts or otherwise fails by moving the coil 190 out of range of the rotor 160.

In addition, the movement of stator coils 190 can function as a voltage regulator as follows. In general, the closer the stator coil 190 is to the rotor 160 the greater the voltage and power it will generate. Further, for embodiments of the generator 100 that are operated under a variable source of mechanical power (e.g., when turbine engine 110 is part of an aircraft that experiences different speeds during flight) the voltage of the generator 100 will increase as the RPM of the engine 110 turns the rotor 160 faster. Therefore, by using positioning means 200 to "back out" the stator coils 190 as the R.P.M. of the rotor 160 (and engine 110) increase, the voltage of the generator 100 can be substantially kept at the desired level.

Figure 6:
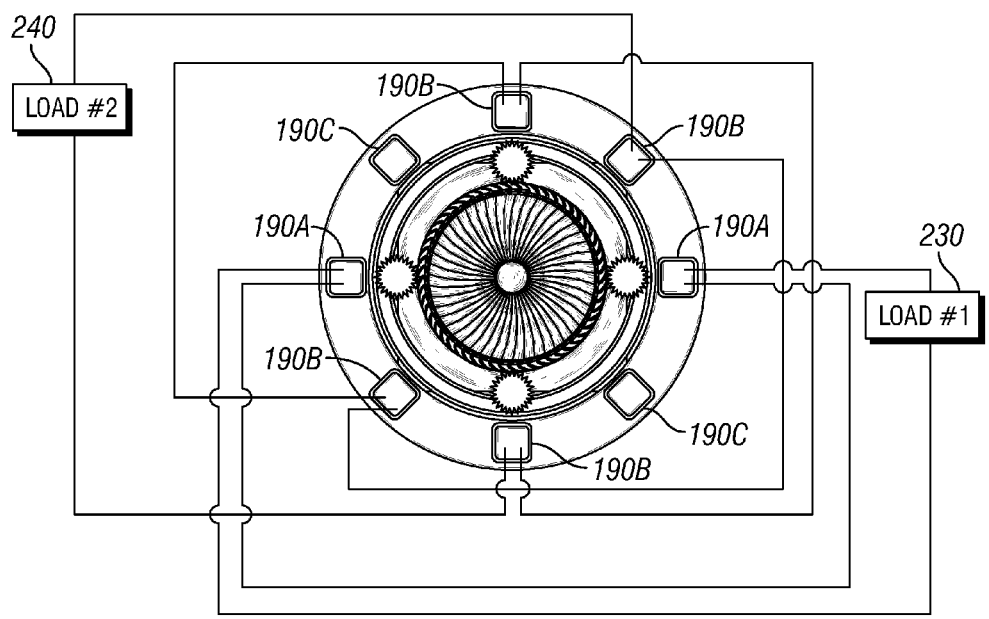
FIG. 6 is a schematic representation of electrically reconfigurable embodiments of the concentric ring generator.

FIG. 6 is a schematic representation of electrically reconfigurable embodiments of the generator 100. Use of the independent stator coils 190 allows for independent and individualized wiring of the coils 190 so that different loads may be accommodated by generator 100. This is particularly useful in the aircraft environment where the electrical needs of aircraft sub-systems (e.g., navigation, radar, weapons systems) can vary and cause interference with each other, in particular when powered by a common generator. As shown in FIG. 6, one set of coils 190A may be wired to power a first load 230 while a different set of coils 190B may be wired to power a second load 240. As represented schematically, an increased set of coils 190B may be used to power higher electrical power loads and a lesser set 190A may be used for lower electrical power loads. In addition, other coils 190C may be used for other loads, may remain out of use, be used as a backup, or the like.

Figure 7:
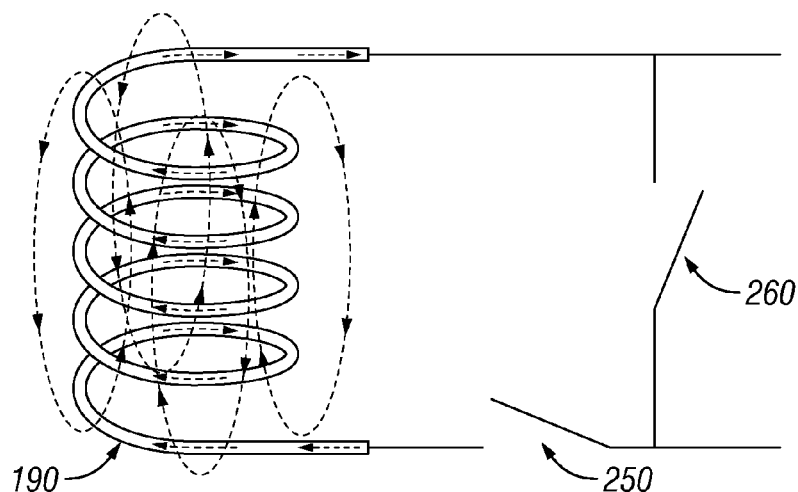
FIG. 7 is a schematic representation of a bypass mechanism in accordance with some disclosed embodiments.

FIG. 7 is a schematic representation of a bypass mechanism in accordance with some disclosed embodiments. This may be implemented with the independent stator coils 190 as follows. Coil 190 may short or otherwise fail and this failure condition may be indicated by an appropriate sensor (not shown) such as a temperature sensor, current sensor, voltage sensor, or the like. If such a condition is sensed, switch 250 may open to remove the coil 190 from the power generation circuit and switch 260 may close to enable another coil (not shown) to replace coil 190 in the circuit. Of course, this sensing and switching may be automated by appropriate control logic, or the like.

Figure 8:
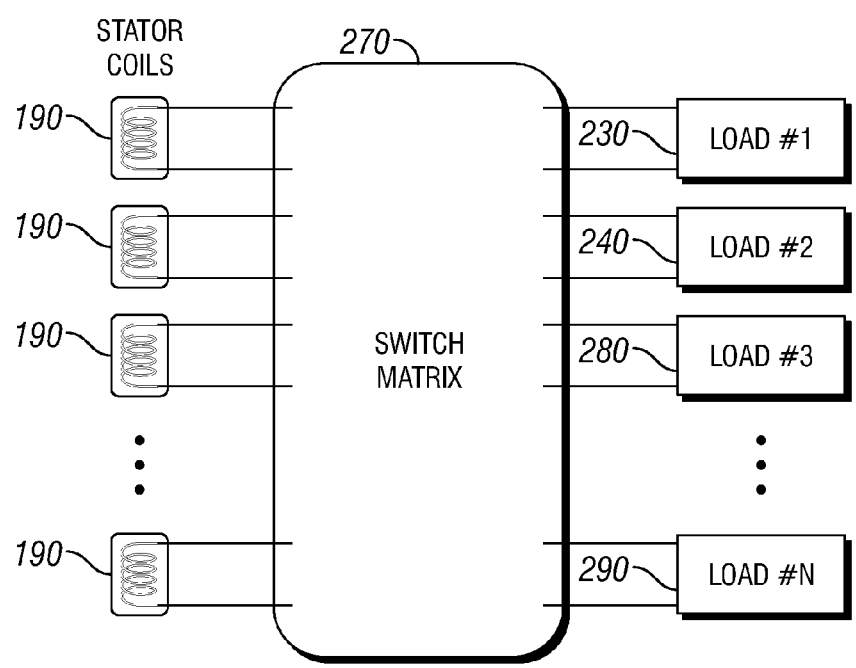
FIG. 8 is a schematic representation of a switching matrix in accordance with disclosed embodiments.

FIG. 8 is a schematic representation of a switching matrix in accordance with disclosed embodiments. In such embodiments, each stator coil 190 is connected to a switch matrix 270 which enables the selective switching of one or more of the stator coils 190 to one or more of the loads (e.g., 230, 240, 280, 290). In this manner, the number of coils 190 can be matched to the size or need of the loads (e.g., 230, 240, 280, 290).

Although various embodiments have been shown and described, the present disclosure is not so limited and will be understood to include all such modifications and variations are would be apparent to one skilled in the art.

What is claimed is:

1. A generator comprising:
    a turbine engine comprising a shaft, a compressor, and a turbine;
    a rotor in mechanical communication with the shaft and configured to be rotated by motion of the shaft;
    a stator comprising at least one coil wherein the stator is disposed radially outward of the rotor and wherein rotation of the rotor within the stator causes the generation of electric power;
    positioning means for moving the at least one coil; and
    wherein the positioning means enables the at least one coil to move radially with respect to the rotor during rotation of the rotor and wherein the radial movement of the at least one coil during rotation of the rotor changes a voltage of the generated electric power.

2. The generator of claim 1 wherein the rotor and the stator are concentric with the shaft of the turbine engine.

3. The generator of claim 1 wherein the rotor further comprises a permanent magnet rotor.

4. The generator of claim 1 further comprising:
    a housing substantially enclosing the turbine engine; and
    wherein the stator is mounted substantially inside the housing.

5. The generator of claim 1 further comprising:
    a housing substantially enclosing the turbine engine; and
    wherein the stator is mounted substantially outside the housing.

6. The generator of claim 1 further comprising:
    a housing substantially enclosing the turbine engine;
    a transmission to transfer motion of the shaft to the rotor; and
    wherein the rotor and stator are concentrically mounted substantially outside the housing.

7. The generator of claim 6 wherein the transmission further comprises:
    at least one gear in mechanical communication with the rotor and imparting rotational motion to the rotor in response to motion of the shaft.

8. The generator of claim 7 wherein the at least one gear is a planetary gear.

9. The generator of claim 1 wherein the rotor is formed integrally with at least one of the compressor and turbine.

10. The generator of claim 1 wherein the rotor and compressor are both in mechanical communication with the shaft.

11. The generator of claim 1 wherein the rotor and turbine are both in mechanical communication with the shaft.

12. A method of manufacturing a generator comprising:
    connecting a rotor in mechanical communication with a shaft of a turbine engine so that the rotor is rotated by motion of the shaft;

positioning a stator comprising at least one coil radially outward of the rotor, concentric with the rotor and the shaft of the turbine engine, and wherein rotation of the rotor within the stator causes the generation of electric power;

providing positioning means for moving the at least one coil; and wherein the positioning means enables the at least one coil to move radially with respect to the rotor during rotation of the rotor and wherein the radial movement of the at least one coil during rotation of the rotor changes a voltage of the generated electric power.

13. The method of claim 12 wherein the step of positioning further comprises:

mounting the stator substantially inside a housing of the turbine engine.

14. The method of claim 12 wherein the step of positioning further comprises:

mounting the stator substantially outside a housing of the turbine engine.

15. The method of claim 12 further comprising:

concentrically mounting the rotor and stator substantially outside a housing of the turbine engine; and connecting a transmission to transfer motion of the shaft to the rotor.

16. A concentric generator comprising:

a turbine engine comprising a shaft, a compressor, and a turbine;

a rotor, mounted concentrically with the shaft, and in mechanical communication with the shaft wherein the rotation of the shaft causes rotation of the rotor;

a stator comprising at least one movable coil positioned concentrically and radially outward of the rotor and wherein rotation of the rotor within the stator causes the generation of electric power;

positioning means for moving the at least one movable coil; and wherein the positioning means enables the at least one moveable coil to move radially with respect to the rotor during rotation of the rotor and wherein the radial movement of the at least one movable coil during rotation of the rotor changes a voltage of the generated electric power.

17. The concentric generator of claim 16 wherein the turbine engine further comprises a housing and the stator is mounted substantially outside the housing.

18. The concentric generator of claim 16 wherein the turbine engine further comprises a housing and the stator is mounted substantially inside the housing.

* * * * *